Jan. 5, 1954   F. D'OZOUVILLE   2,664,981
ELECTROMAGNETICALLY CONTROLLED FRICTION CLUTCH
Filed March 13, 1950   3 Sheets-Sheet 2
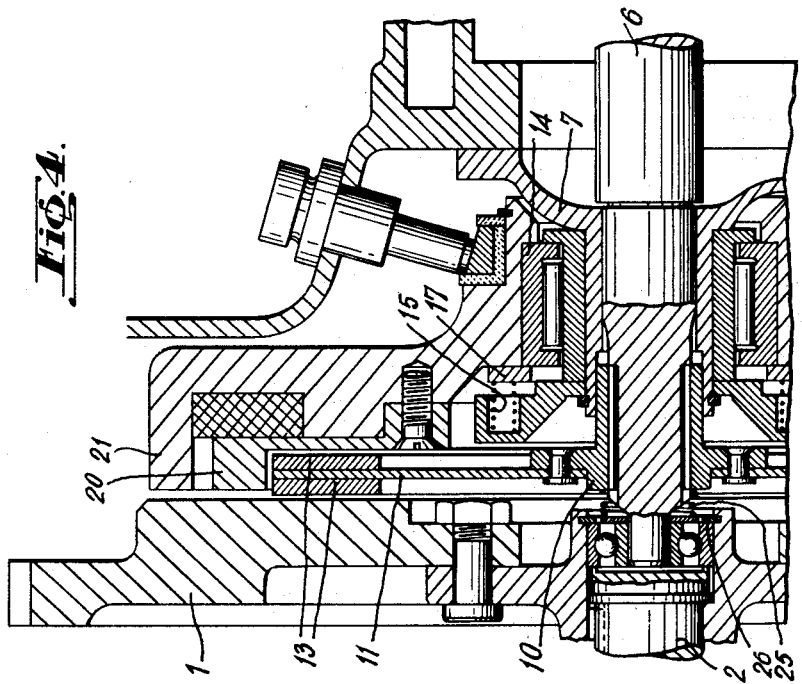
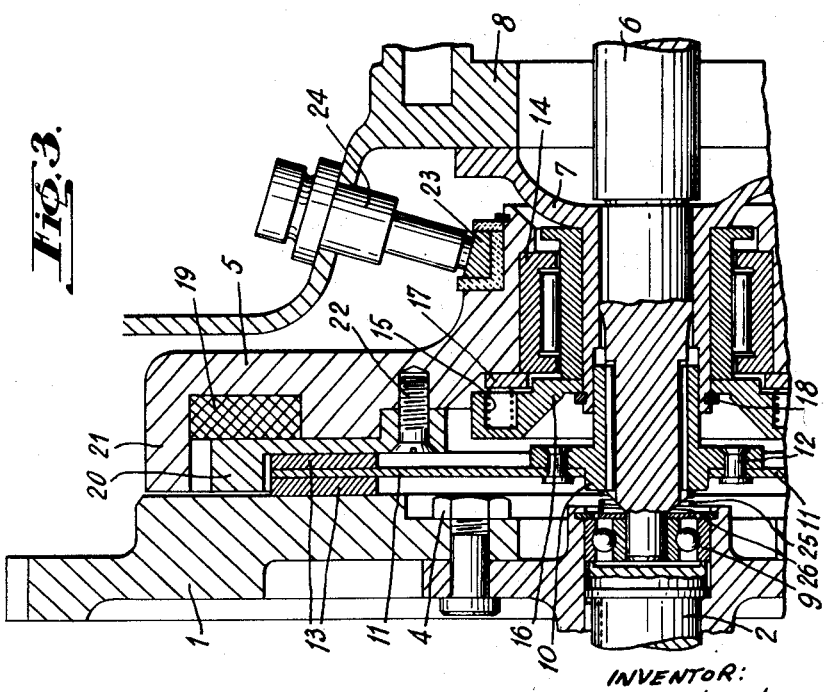
INVENTOR:
FRANÇOIS D'OZOUVILLE Jan. 5, 1954  F. D'OZOUVILLE  2,664,981
ELECTROMAGNETICALLY CONTROLLED FRICTION CLUTCH
Filed March 13, 1950  3 Sheets-Sheet 3
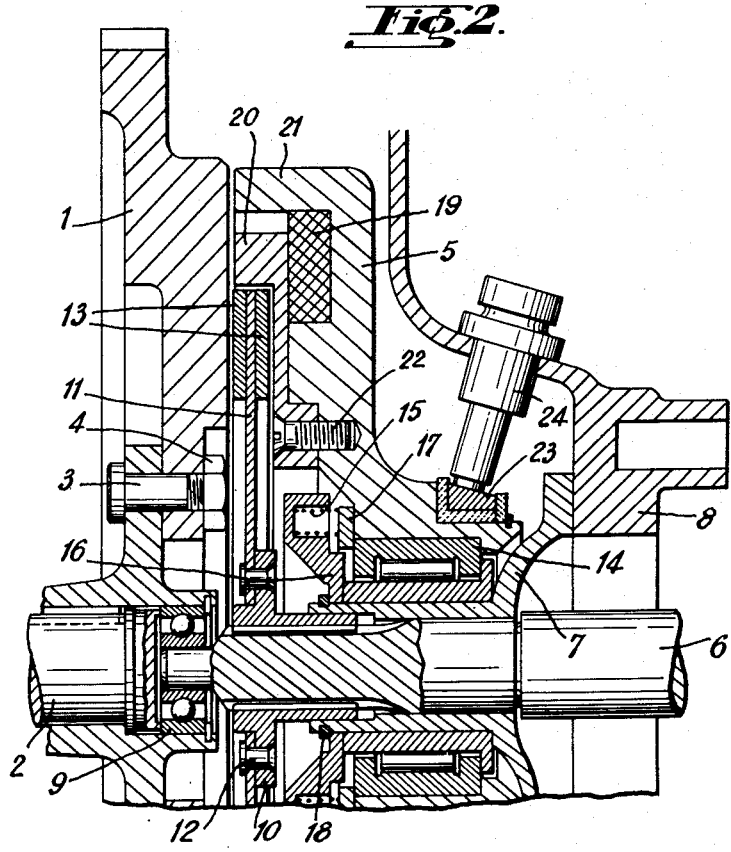
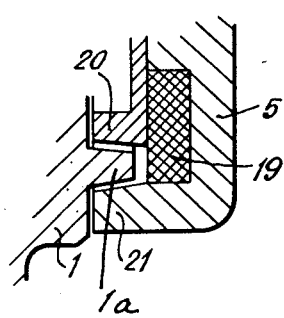
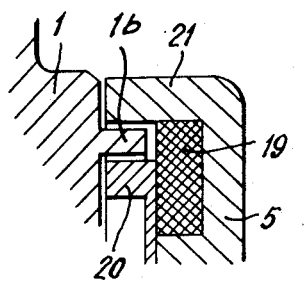
INVENTOR:
FRANÇOIS D'OZOUVILLE Patented Jan. 5, 1954

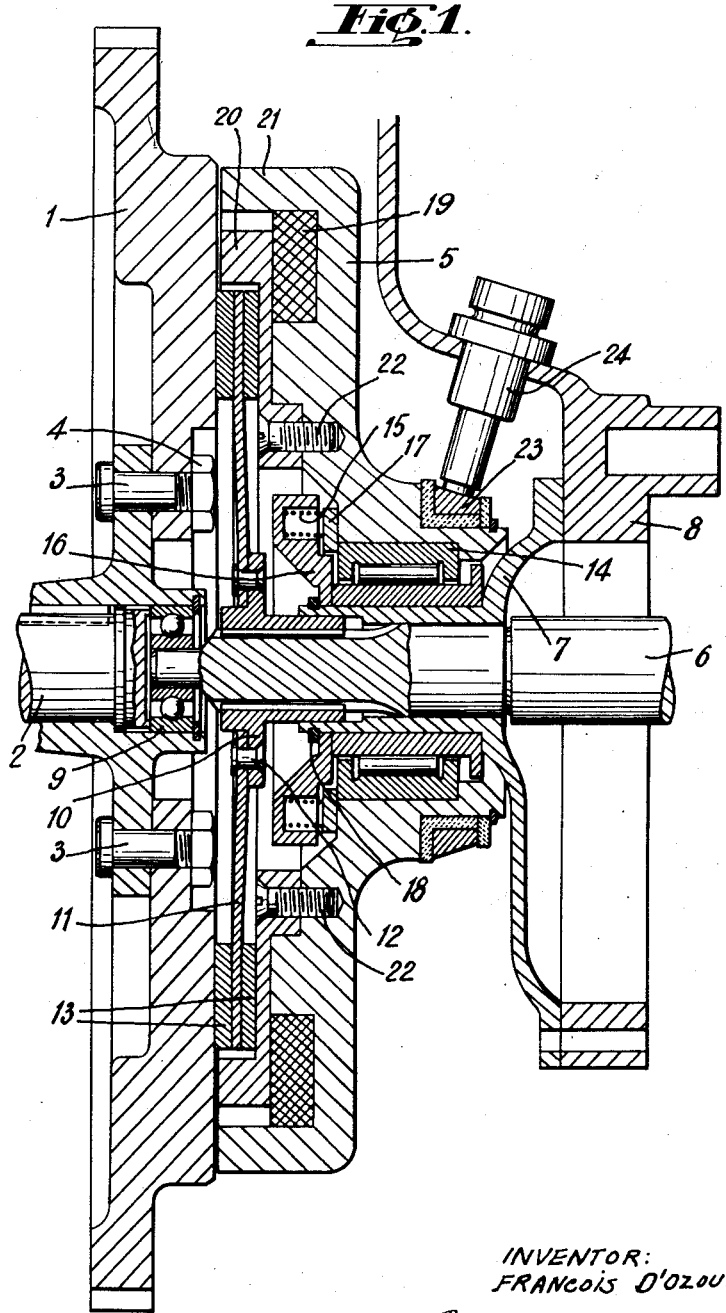

2,664,981

UNITED STATES PATENT OFFICE 2,664,981

ELECTROMAGNETICALLY CONTROLLED FRICTION CLUTCH

François d'Ozouville, Paris, France, assignor to Siper S. A., Emsallah, Tangier, a corporation of the Tangier Zone Application March 13, 1950, Serial No. 149,365

Claims priority, application Switzerland November 3, 1949

10 Claims. (Cl. 192—84)

The present invention relates to an electromagnetically controlled friction clutch. Devices of this type are already known. In certain mechanical power transmissions, especially in those designed to equip vehicles, and to drive their propulsive members, it is often desirable to have a clutch having a small inertia and thus facilitating the passage from one speed to the other of a multiple-speed gear-box forming part of the transmission. The invention aims at providing an electro-magnetically controlled friction clutch having a mechanical inertia which is smaller than that of known devices of a similar type. The clutch according to the invention comprises at least one axially movable electro-magnet, arranged to revolve around the driven shaft, a disk of magnetic material secured to the driving shaft, and arranged opposite the electro-magnet and forming the armature of the same, and a disk secured to the driven shaft and arranged to be clamped in between the electro-magnet and its armature, and to be then driven by friction by this armature.

In the drawings:

Fig. 1 shows a longitudinal section of an embodiment of a clutch device according to the present invention, showing the clutch in engaged position;

Fig. 2 is a view of the device of Fig. 1 showing the clutch in disengaged position;

Fig. 3 is a longitudinal section of another embodiment of a clutch device according to the present invention showing the clutch in engaged position.

Fig. 4 is a view of the device of Fig. 3 with the clutch in disengaged position.

Fig. 5 is a sectional view of a different embodiment of the poles of the electromagnet; and Fig. 6 is a sectional view of another embodiment of the poles of the electromagnet.

The clutch shown comprises a disk 1 secured to a driving shaft 2, to a flange of which it is bolted by bolts 3, passing through this flange and this disk and by nuts 4. The disk 1 is made of magnetic material and forms the armature of an electro-magnet 5, 19. It forms at the same time a flywheel steadying the motion of the shaft 2, which may be driven by an internal combustion engine. The driven shaft 6 is carried in a bearing 7 fixed to a casing 8, which partially surrounds the clutch. This shaft is centered coaxially to the shaft 2 by means of a ball bearing 9 mounted on the shaft 2 and secured at the extremity of this shaft. The casing 8 is designed to be fixed to another part of casing, carrying a bearing, not shown, surrounding the shaft 2. A grooved sleeve 10 is mounted on the grooved end of the shaft 6 and revolves with this shaft. This sleeve bears a flange to which a disk 11 is secured by means of rivets 12. This disk 11 bears a friction lining 13 on each of its faces.

A roller bearing 14 surrounds the bearing 7 of the shaft 6. This bearing is designed to allow a certain axial displacement of its outer race relatively to its inner race, which is fixed to the bearing 7. The body 5 of the electromagnet is made of magnetic material and is fixed to the outer race of the bearing 14. This body 5 is maintained at a certain distance from the armature 1 of the electro-magnet under the action of springs 15, lodged in a dished disk 16 and pressing an intermediate ring 17 against the outer race of the bearing 14 and against a surface of the body 5 of the electro-magnet facing the armature 1. The disk 16 is secured axially on the bearing 7 by means of a split collar 18, which engages in a circular groove of this bearing 7. The inner race of the bearing 14 has a flange which acts as a stop limiting the axial movement of the outer race of this roller bearing and of the body 5 of the electro-magnet, under the action of the springs 15. A ring-shaped winding 19 is mounted in a circular coaxial groove of the body 5 of the electro-magnet. This winding is partially covered by a ring 20, made of magnetic and wear-resisting material and having a cylindrical flange which forms one of the poles of the electro-magnet. The other pole of the electro-magnet is formed by a cylindrical flange 21 of the body 5, this flange surrounding the flange of the rings 20 at a certain distance. According to the drawing, the faces of the poles are flat, but they could also be conical as shown in Fig. 5, thus forming between them a groove having a trapezoidal cross section, and co-operating with a rib 1a, borne by the armature 1, and having a corresponding trapezoidal cross section. This arrangement, and other similar arrangements, enable the variations of the air gap, due to wear of the linings 13 of the disk 11, to be reduced in a certain measure. The poles could also surround a groove of rectangular cross section as shown in Fig. 6, co-operating with a slightly narrower rib 1b of rectangular cross section borne by the armature 1. In this case variations in the air gap due to wear of the linings 13 of the disk 11 would be practically negligible. Such arrangements of the poles and of the armature also result in a gentler and more gradual action of the clutch. The ring 20 is fixed to the body 5 of the electro-magnet by means of screws 22, which are parallel to the axis of the clutch. The body 5 is fitted with an insulated slipring 23 mounted on its hub. This slipring is connected to one end of the winding 19, the other end of which is connected to the mass of the body 5. It cooperates with an insulated contact brush 24, mounted in the casing 8. This brush has a graphite contact piece pressed against the slipring by a spring, and arranged so as to allow the slipring to move axially with the body 5 relatively to the brush. When an electric current is sent through the winding 19 by means of the brush 24 and of the slipring 23, the electro-magnet is energized and its magnetic circuit closes through the armature 1, between the poles 20 and 21 of the electro-magnet. The resulting magnetic force causes the body 5 to move towards the armature 1 against the action of the springs 15 to the position shown in Fig. 1. The body 5 is thus pressed against the adjacent lining 13 of the disk 11 and forced to revolve with this disk, supposing the vehicle is moving and the driven shaft is therefore revolving. The body 5 presses the other linings 13 of the disk 11 against the armature 1 and the disk 11 with its linings 13 is thus clamped between the body of the electro-magnet and its armature 1. The shaft 2 is thus coupled to the shaft 6 which revolves at the same speed as the shaft 2. The acceleration or slowing down of the shaft 6 by the shaft 2 occurs gradually, all jolts being eliminated by the slipping of the disk between the body 5 of the electro-magnet and its armature 1. When the electro-magnet is attracted towards its armature, a small air-gap subsists between the poles 20 and 21 of this electro-magnet and the adjacent face of its armature 1. The width of this air-gap depends on the total thickness of the disk 11 and of its linings 13.

When the clutch is engaged and the shafts 2 and 6 are therefore coupled together, the clutch described has a considerable mechanical inertia, the inertia of its armature 1, which acts as a flywheel, being added to the inertia of the disk 11 and of the linings 13 and to the inertia of the body 5 of the electro-magnet, which bears the winding 19 and the ring 20. When no current is flowing through the winding 19 the springs 15 move the body 5 of the electro-magnet axially away from the armature 1 to the position shown in Fig. 2, thus releasing the disk 11 and its linings 13. The driven shaft 6 is thus uncoupled from the shaft 2 and the inertia of the parts of the clutch which revolve with the shaft 6 is reduced to that of the disk 11 and of its linings 13, so that kinetic energy which could have been accumulated in the clutch as a whole is not transmitted to the shaft 6, but remains stored in the flywheel 1, which continues to steady the motion of the engine, and in the body 5 of the electro-magnet, which revolves freely on the bearing 14. This arrangement greatly facilitates gear-changing in a multiple-speed gear-box connecting the driven shaft 6 with the propulsive organs of a vehicle equipped with a clutch such as the one described.

The air-gap subsisting between the flywheel 1 and the poles 20 and 21 of the electro-magnet is necessary when the linings 13 are made of asbestos material. The disc 11 is made of steel or bronze. With linings of fritted material, the poles of the electro-magnet could be arranged to press directly on the adjacent lining. This fritted material could be a magnetic material obtained by incorporating ferro-magnetic filings (cast-iron or soft steel, etc.), in a non-magnetic binder such as those generally used in fritting processes. The magnetic circuit of the electro-magnet would then be closed through the linings themselves, and the effective air-gap would be reduced owing to the fact that this conglomerate formed of magnetic and non-magnetic material has a certain permeability. Thanks to the air-gap or to the magnetic reluctance of the linings the clutch described engages very gradually. This gradual action can be regulated either at will or automatically by modifying the voltage applied between the brush 24 and the mass of the clutch.

In the embodiment described, the disk 11 is rigidly secured on the shaft 6. Its axial position on this shaft is such that, when the electro-magnet is not energised and the body 5 of said electromagnet is held apart from its armature 1, the linings 13 of this disk do not touch the armature 1, nor the ring 20. The disk 11 is however elastically deformable and, when the electro-magnet is energised, its periphery carrying the linings 13 is deflected to the left, as seen on the drawing, by the ring 20 which is attracted towards the armature 1 together with the body 5. Thus, the disk 11 becomes concave, its concavity facing the left on the drawing, as its periphery with the linings 13 is clamped between the armature 1 and the ring 20.

Alternatively, in a modification shown in Figs. 3 and 4, the sleeve 10 is keyed on the shaft 6 on which it can slide axially. A compression spring 25 abutting the sleeve 10 and a washer 26 mounted against the adjacent side of the inner race of the bearing 9 urges the sleeve axially towards the right, as shown in Figs. 3 and 4, against an abutment provided by the ends of the longitudinal grooves formed in the shaft 6. Thus, the disk 11 with its lining 13 is held apart from the armature 1, and from the ring 20 by springs 15 holding ring 20 away from disk 11, so long as the electromagnet is not energised.

The ring 20 is interchangeable independently from the body 5 of the electro-magnet, and can be made of wear-resisting magnetic material, such as cast-iron or steel for instance.

What I claim is:

1. An electromagnetically operated friction clutch having a driven part, comprising in combination, a driving shaft; a driving disc of ferro-magnetic material mounted for rotation with said driving shaft, said driving disc having a friction surface; a driven shaft; an electromagnet mounted around said driven shaft so as to be freely rotatable with respect to said driving and driven shafts, said electromagnet having a body having a friction surface, said driving disc forming the armature of said electromagnet; a driven disc arrangement mounted for rotation with said driven shaft and having friction surfaces arranged between said friction surfaces of said armature and said body; at least one spring means permanently tending to move said electromagnet in a direction away from said driving disc and said driven disc arrangement; and resilient means forming part of said driven disc arrangement and holding said driven disc arrangement apart from said armature when said electromagnet is not energized, whereby the driving and driven parts of the clutch have a small inertia when the clutch is disengaged.

2. An electromagnetically operated friction clutch having a driven part, comprising in combination, a driving shaft; a driving disc of ferromagnetic material mounted for rotation with said driving shaft, said driving disc having a friction surface; a driven shaft; an electromagnet mounted around said driven shaft so as to be freely rotatable with respect to said driving and driven shafts, said electromagnet having a body having a friction surface, said driving disc forming the armature of said electromagnet; a driven disc mounted for rotation with said driven shaft and having friction surfaces arranged between said friction surfaces of said armature and said body; and, said driven disc being elastically deformable so as to form resilient means, the periphery of said driven disc being held apart by said resilient means from said armature when said electromagnet is not energized and being axially displaced when said electromagnet is energized so that the friction surfaces of said driven disc are clamped between the friction surfaces of said armature and said body of said electromagnet; and at least one spring means permanently tending to move said electromagnet in a direction away from said driving disc and said driven disc whereby the driving and driven parts of the clutch have a small inertia when the clutch is disengaged.

3. An electromagnetically operated friction clutch having a driven part, comprising in combination, a driving shaft; a driving disc of ferromagnetic material mounted for rotation with said driving shaft, said driving disc having a friction surface; a driven shaft; an electromagnet mounted around said driven shaft so as to be freely rotatable with respect to said driving and driven shafts, said electromagnet having a body having a friction surface, said driving disc forming the armature of said electromagnet; a driven disc arrangement mounted for rotation with said driven shaft and having friction surfaces arranged between said friction surfaces of said driving disc mounted for rotation with said driving shaft and of said body of said electromagnet mounted freely rotatably around said driven shaft; at least one spring means permanently tending to move said electromagnet in a direction away from said driving disc and said driven disc arrangement; and means for energizing said electromagnet, whenever required, such energization resulting in attraction of said electromagnet by said driving disc and clamping of said driven disc arrangement between the friction surfaces of said driving disc and electromagnet resulting in rotation of the latter together with said driving disc and said driven disc arrangement, whereas when said electromagnet is not energized said spring means is holding said electromagnet apart from said driven disc arrangement and said driving disc so as to avoid any rotation of said electromagnet by said driving disc together with the same and the driven disc arrangement thus reducing the inertia of the rotating parts of said friction clutch.

4. An electromagnetically operated friction clutch having a driven part, comprising in combination, a driving shaft; a driving disc of ferromagnetic material mounted for rotation with said driving shaft, said driving disc having a friction surface; a driven shaft; a bearing means having a first part fixedly secured to said driven shaft and a second part being axially displaceable with respect to said first part; an electromagnet having a body rigidly connected to said second part of said bearing means so as to be freely rotatable with respect to said driving and driven shafts, said body having a friction surface, said driving disc forming the armature of said electromagnet; a driven disc arrangement mounted for rotation with said driven shaft and having friction surfaces arranged between said friction surfaces of said driving disc mounted for rotation with said driving shaft and of said body of said electromagnet mounted freely rotatably around said driven shaft; at least one spring means permanently tending to move said electromagnet in a direction away from said driving disc and said driven disc arrangement; and means for energizing said electromagnet, whenever required, such energization resulting in attraction of said electromagnet by said driving disc and clamping of said driven disc arrangement between the friction surfaces of said driving disc and electromagnet resulting in rotation of the latter together with said driving disc and said driven disc arrangement, whereas when said electromagnet is not energized said spring means is holding said electromagnet apart from said driven disc arrangement and said driving disc so as to avoid any rotation of said electromagnet by said driving disc together with the same and the driven disc arrangement thus reducing the inertia of the rotating parts of said friction clutch.

5. An electromagnetically operated friction clutch having a driven part, comprising in combination, a driving shaft; a driving disc of ferromagnetic material mounted for rotation with said driving shaft, said driving disc having a friction surface; a driven shaft; a bearing means having a first part fixedly secured to said driven shaft and a second part being axially displaceable with respect to said first part; an electromagnet having a body rigidly connected to said second part of said bearing means so as to be freely rotatable with respect to said driving and driven shafts, said body having a friction surface, said driving disc forming the armature of said electromagnet; a driven disc arrangement mounted for rotation with said driven shaft and having friction surfaces arranged between said friction surfaces of said armature and said body; and resilient means forming part of said driven disc arrangement and holding said driven disc arrangement apart from said armature when said electromagnet is not energized, whereby the driving and driven parts of the clutch have a small inertia when the clutch is disengaged.

6. An electromagnetically operated friction clutch having a driven part, comprising in combination, a driving shaft; a driving disc of ferromagnetic material mounted for rotation with said driving shaft, said driving disc having a friction surface; a driven shaft; a bearing means having a first part fixedly secured to said driven shaft and a second part being axially displaceable with respect to said first part; an electromagnet having a body rigidly connected to said second part of said bearing means so as to be freely rotatable with respect to said driving and driven shafts, said body having a friction surface, said driving disc forming the armature of said electromagnet; a driven disc mounted for rotation with said driven shaft and having friction surfaces arranged between said friction surfaces of said armature and said body, said driven disc being elastically deformable so as to form resilient means, the periphery of said driven disc being held apart by said resilient means from said armature when said electromagnet is not energized and being axially displaced when said electromagnet is energized so that the friction surfaces of said driven disc are clamped between the friction surfaces of said armature and said body of said electromagnet; and at least one spring means permanently tending to move said electromagnet in a direction away from said driving disc and said driven disc, whereby the driving and driven parts of the clutch have a small inertia when the clutch is disengaged.

7. An electromagnetically operated friction clutch having a driven part, comprising in combination, a driving shaft; a driving disc of ferromagnetic material mounted for rotation with said driving shaft, said driving disc having a friction surface; a driven shaft; an electromagnet mounted around said driven shaft so as to be freely rotatable with respect to said driving and driven shafts, said electromagnet having a body having a friction surface, said driving disc forming the armature of said electromagnet; a driven disc arrangement mounted for rotation with said driven shaft and having friction surfaces arranged between said friction surfaces of said armature and said body; resilient means forming part of said driven disc arrangement and holding said driven disc arrangement apart from said armature and when the latter is not energized, whereby the driving and driven parts of the clutch have a small inertia when the clutch is disengaged, said electromagnet having an annular coil arranged coaxially with said body; and a member consisting of wear-resisting material partly covering said annular coil and secured to the face of said body facing said armature, said wear-resisting member having a part surrounding the periphery of said driven disc arrangement and forming the inner pole piece of said electromagnet.

8. An electromagnetically operated friction clutch having a driven part, comprising in combination, a driving shaft; a driving disc of ferromagnetic material mounted for rotation with said driving shaft, said driving disc having a friction surface; a driven shaft; an electromagnet mounted around said driven shaft so as to be freely rotatable with respect to said driving and driven shafts, said electromagnet having a body having a friction surface, said driving disc forming the armature of said electromagnet; a driven disc arrangement mounted for rotation with said driven shaft and having friction surfaces arranged between said friction surfaces of said armature and said body; resilient means forming part of said driven disc arrangement and holding said driven disc arrangement apart from said armature when the latter is not energized, whereby the driving and driven parts of the clutch have a small inertia when the clutch is disengaged, said electromagnet having an annular coil arranged coaxially with said body; a member consisting of wear-resisting material partly covering said annular coil and secured to the face of said body facing said armature, said wear-resisting member having a part surrounding the periphery of said driven disc arrangement and forming the inner pole piece of said electromagnet; and an inner flange forming part of said wear-resisting member and carrying said friction surface of said body.

9. An electromagnetically operated friction clutch having a driven part, comprising in combination, a driving shaft; a driving disc of ferromagnetic material mounted for rotation with said driving shaft, said driving disc having a friction surface; a driven shaft; an electromagnet mounted around said driven shaft so as to be freely rotatable with respect to said driving and driven shafts, said electromagnet having a body having a friction surface, said driving disc forming the armature of said electromagnet; a driven disc mounted for rotation with said driven shaft and having friction surfaces arranged between said friction surfaces of said armature and said body, said driven disc being elastically deformable so as to form resilient means, the periphery of said driven disc being held apart by said resilient means from said armature when the latter is not energized and being axially displaced when said electromagnet is energized so that the friction surfaces of said driven disc are clamped between the friction surfaces of said armature and said body of said electromagnet; and at least one spring means permanently tending to move said electromagnet in a direction away from said driving disc and said driven disc, whereby the driving and driven parts of the clutch have a small inertia when the clutch is disengaged, said electromagnet having an annular coil arranged coaxially with said body; and a member consisting of wear-resisting material partly covering said annular coil and secured to the face of said body facing said armature, said wear-resisting member having a part surrounding the periphery of said driven disc arrangement and forming the inner pole piece of said electromagnet.

10. An electromagnetically operated friction clutch having a driven part, comprising in combination, a driving shaft; a driving disc of ferromagnetic material mounted for rotation with said driving shaft, said driving disc having a friction surface; a driven shaft; an electromagnet mounted around said driven shaft so as to be freely rotatable with respect to said driving and driven shafts, said electromagnet having a body having a friction surface, said driving disc forming the armature of said electromagnet; a driven disc mounted for rotation with said driven shaft and having friction surfaces arranged between said friction surfaces of said armature and said body, said driven disc being elastically deformable so as to form resilient means, the periphery of said driven disc being held apart by said resilient means from said armature when the latter is not energized and being axially displaced when said electromagnet is energized so that the friction surfaces of said driven disc are clamped between the friction surfaces of said armature and said body of said electromagnet; at least one spring means permanently tending to move said electromagnet in a direction away from said driving disc and said driven disc, whereby the driving and driven parts of the clutch have a small inertia when the clutch is disengaged, said electromagnet having an annular coil arranged coaxially with said body; a member consisting of wear-resisting material partly covering said annular coil and secured to the face of said body facing said armature, said wear-resisting member having a part surrounding the periphery of said driven disc arrangement and forming the inner pole piece of said electromagnet; and an inner flange forming part of said wear-resisting member and carrying said friction surface of said body.

FRANÇOIS D'OZOUVILLE.

References Cited in the file of this patent

UNITED STATES PATENTS

| Number | Name | Date |
|---|---|---|
| 741,895 | Earll | Oct. 20, 1903 |
| 1,756,907 | Payne | Apr. 29, 1930 |
| 1,825,686 | Walker | Oct. 6, 1931 |
| 1,925,956 | Easter | Sept. 5, 1933 |
| 2,102,318 | Hodgson | Dec. 14, 1937 |

FOREIGN PATENTS

| Number | Country | Date |
|---|---|---|
| 617,406 | Great Britain | Feb. 4, 1949 |
| 883,523 | France | July 7, 1948 |